United States Patent [19]

Stevenson

[11] Patent Number: 5,065,830

[45] Date of Patent: Nov. 19, 1991

[54] PORTABLE APPARATUS TO WEIGH AND MEASURE INFANTS

[76] Inventor: Steven Stevenson, P.O. Box 12, Wingdale, N.Y. 12545

[21] Appl. No.: 652,000

[22] Filed: Feb. 7, 1991

[51] Int. Cl.⁵ ............................................. G01G 21/22
[52] U.S. Cl. .................................... 177/263; 177/126; 177/245; 177/262
[58] Field of Search ................. 177/262, 263, 126, 127, 177/245

[56] References Cited

U.S. PATENT DOCUMENTS

| | | | |
|---|---|---|---|
| 945,530 | 1/1910 | Hayden | 177/263 |
| 1,371,281 | 3/1921 | Weber | 177/245 |
| 1,383,505 | 7/1920 | Weber | 177/245 |
| 1,853,198 | 4/1932 | Breaden | 177/245 |
| 2,210,399 | 5/1938 | Ericksen | 177/126 |
| 2,598,532 | 5/1952 | Gibbon | 177/245 |
| 2,611,604 | 9/1952 | Sutton et al. | 177/126 |
| 2,990,899 | 7/1961 | Bella | 177/245 |

Primary Examiner—Benjamin R. Fuller
Assistant Examiner—Randy W. Gibson
Attorney, Agent, or Firm—Martin J. Spellman, Jr.

[57] ABSTRACT

Apparatus for conveniently and safely weighing and measuring infants including a cloth bed with a foldable peripheral frame divided into a head section, central body section, and foot section which fold upon each other. A folding head panel is secured to the head portion of the frame to place the infant's head against for measuring length by means of a measuring tape running along the longitudinal axis of the top of bed surface. An extensible end section is provided for larger infants. The bed is detachably suspended by three pairs of cords removably secured to a digital scale for weighing in pounds and grams. Included is separate measuring tape for determining the circumference of the infant's head, torso and other desired measurements.

8 Claims, 3 Drawing Sheets

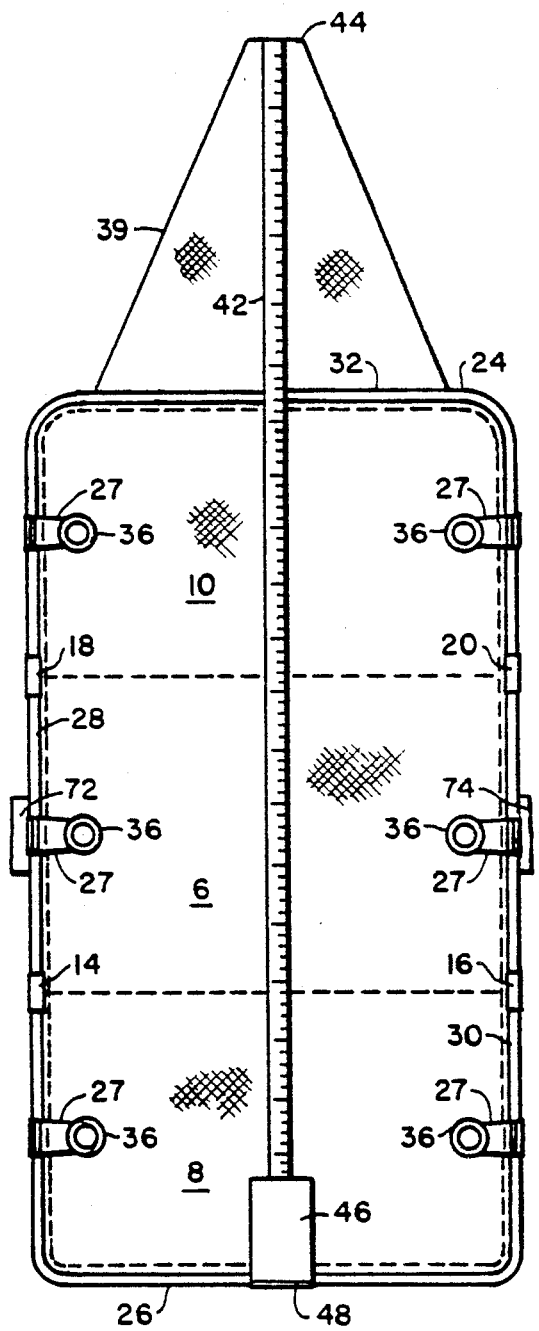
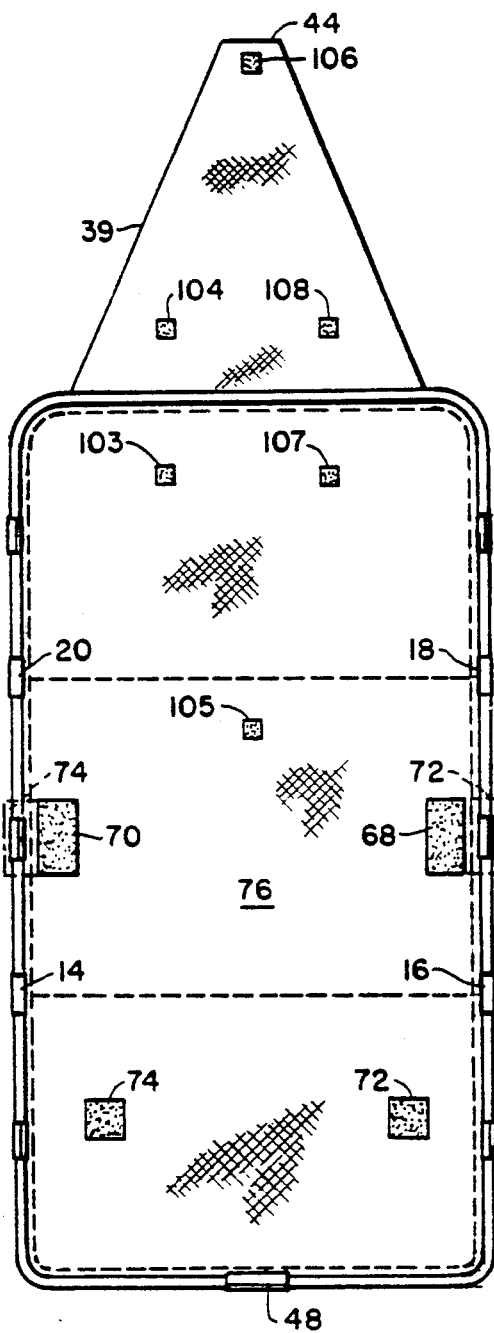

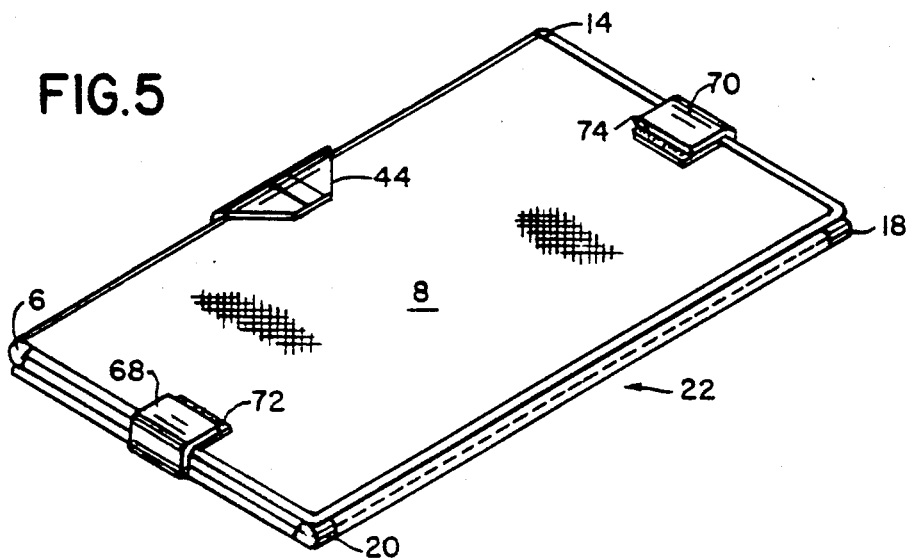
FIG.5
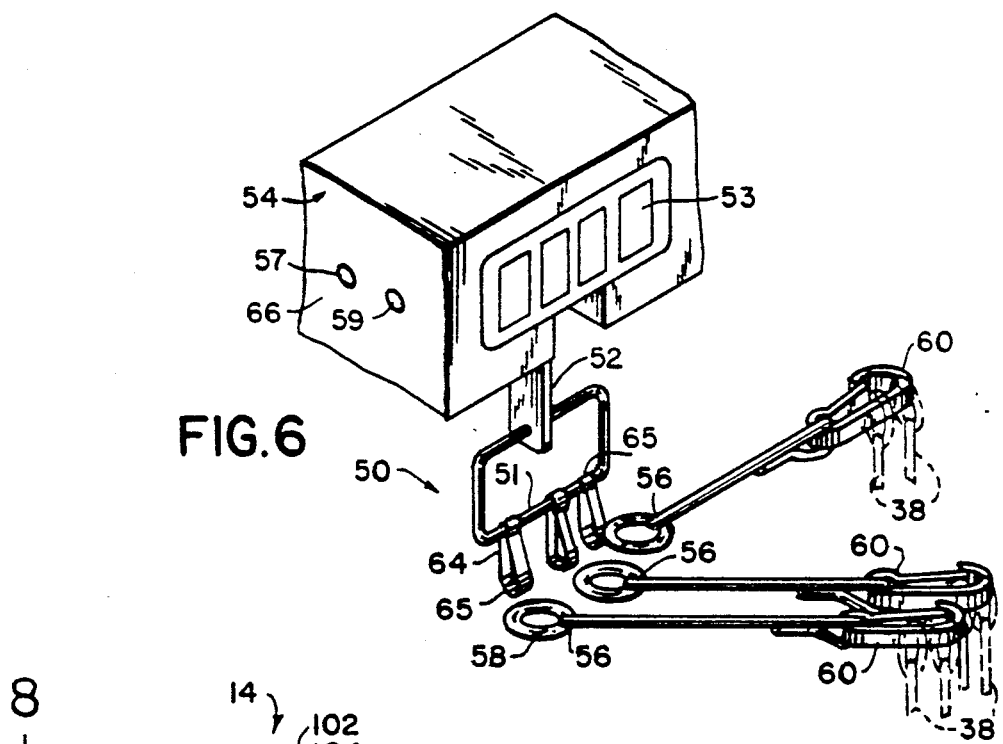
FIG.6
FIG.7
FIG.8

PORTABLE APPARATUS TO WEIGH AND MEASURE INFANTS

BACKGROUND OF THE INVENTION

1. Field of the Invention

The invention is concerned with a portable apparatus for conveniently, safely and accurately weighing infants and measuring their length.

2. Prior Art

U.S. Pat. No. 945,530—K. B. HAYDEN discloses an infant's weighing device comprising a blank of pliable material stitched on corded lines to impart a corrugated appearance and a cup-like form. Also included is a drawstring to further shape the device to a cup-like structure and to be able to adjust the size to some extent. Extensions of the cord are provided with rings to permit attachment to a weighing device. This device is uncomfortable for an infant, handling the infant was difficult and dangerous.

U.S. Pat. No. 1,252,824—A. MELNIKER discloses a foldable cradle including foldable side frame members, collapsible end frames and means for hanging the cradle from suspending hooks.

U.S. Pat. No. 1,853,198—C. E. BREADEN discloses a weighing scale platform for packages which also incorporates measuring means along three axii for measuring the size of a package.

U.S. Pat. No. 440,959—P. A. O'MARRA discloses a combination desk ruler and paper or package weighing scale. The apparatus shown in this patent is awkward to use and uncomfortable for the infant. No means were provided for readily measuring the length and circumference of the infant nor is it constructed to fold down flat.

SUMMARY OF THE INVENTION

The present invention is directed towards providing a safe, convenient apparatus for holding and accurately weighing infants, and also measuring their length, head and chest circumference. The device may be quickly folded up to a flat, compact form when not in use. A separate measuring tape for determining circumferences is stored in the apparatus.

The device is easy to handle by the user, comfortable for the newborn and premature infants providing a soft flexible surface and may readily be folded and taken from one location to another without inconvenience.

The device of the present invention, because of its convenience and accuracy of results obtained by its use provides essential information to a breast feeding mother to measure how much milk the baby has taken in each breast feeding.

The apparatus also provides accurate information for weight, length, head and chest circumference of infants from birth, and premature infants.

The apparatus provides essential and valid information to the pediatrician, nursing staff and mother of healthy and sick infants to determine the amount of the milk or fluid remaining in the baby's stomach after vomiting.

In the case of the development of edema, which develops in so many babies' diseases and the low protein diet of infancy, pediatricians can measure the amount of edema, and make easy follow-up and prognosis concerning the sick infant.

It also is useful to measurement of the ascites, by weighing and measurement of the abdominal circumference in sick infants.

The foregoing advantages and objectives are achieved by provided apparatus comprising of a cloth bed which is comfortable and easily conforms to the contours of the infant. The cloth bed is approximately 25-26 inches long and 14-15 inches wide. The cloth material is hemmed about its periphery onto a peripheral foldable rod frame. The bed has a head, central and foot section of approximately equal length and two pairs of hinged opposed joints which operate through 180° are formed in the peripheral frame so that the bed may be folded upon itself in thirds. A measuring tape or other indicia in both inches and centimeters is secured on the top surface of the bed along its longitudinal axis from the end edge of the head section through the end edge of the foot extension. A foldable head panel is provided to rest the infant's head against for length measure. A measuring cloth tape or digit tape for measuring the circumference of areas of the infant is included and may be stored in storage pockets on the cloth of the bed or in a pocket formed in the head panel.

The bed is provided with pairs of cords secured at one end on opposed sides of each of the head, central and foot sections approximately at mid-point of the side frame of each section. The other ends of the cords are detachably secured by dog leash brackets in pairs to a bar holder which is connected to a depending arm from a digital scale which is readable selectively in pounds or kilograms and the displayed weight may be selectively fixed on or cleared from the display. Such scales are readily available commercially.

Velcro type of fasteners are provided to hold the sections folded together when the bed in not in use.

BRIEF DESCRIPTION OF THE DRAWINGS

In the accompanying drawings, which form a part of this specification:

FIG. 3 is a top plan view of the bed with suspension cords removed;

FIG. 4 is a bottom plan view of the bed;

FIG. 5 is a perspective view of the bed folded up and secured closed;

FIG. 6 is a perspective view of detachable means for connecting the cords to the scale;

FIG. 7 is a top plan view of a hinge joint of the foldable supporting frame; and FIG. 8 is a side view of the hinges joint of FIG. 7 partially in section.

DESCRIPTION OF AN ILLUSTRATIVE EMBODIMENT

Figure 1:
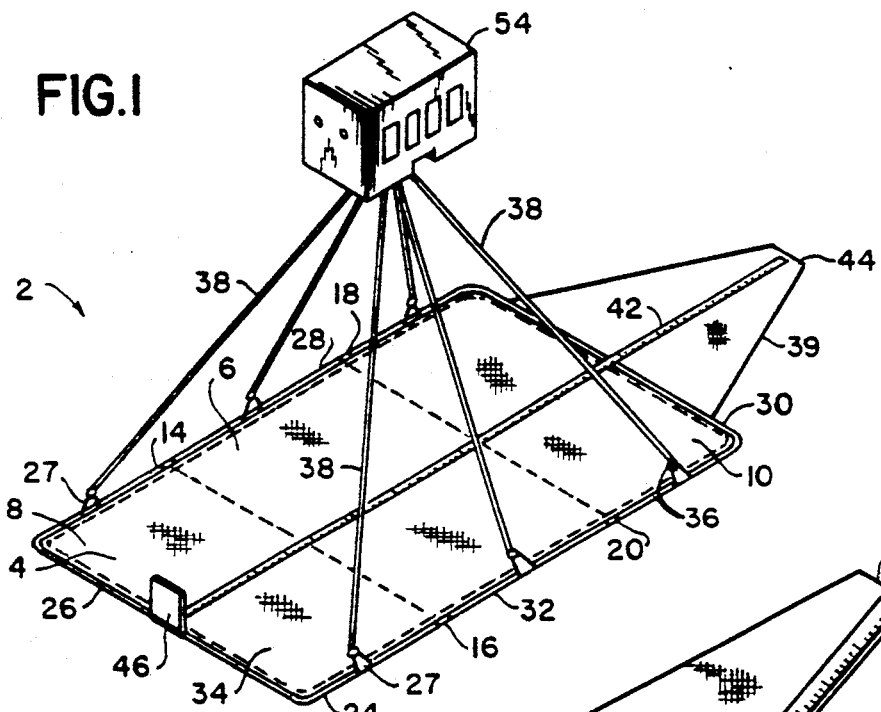
FIG. 1 is a perspective view of the apparatus of the present invention showing the bed suspended from a digital scale.
Figure 2:
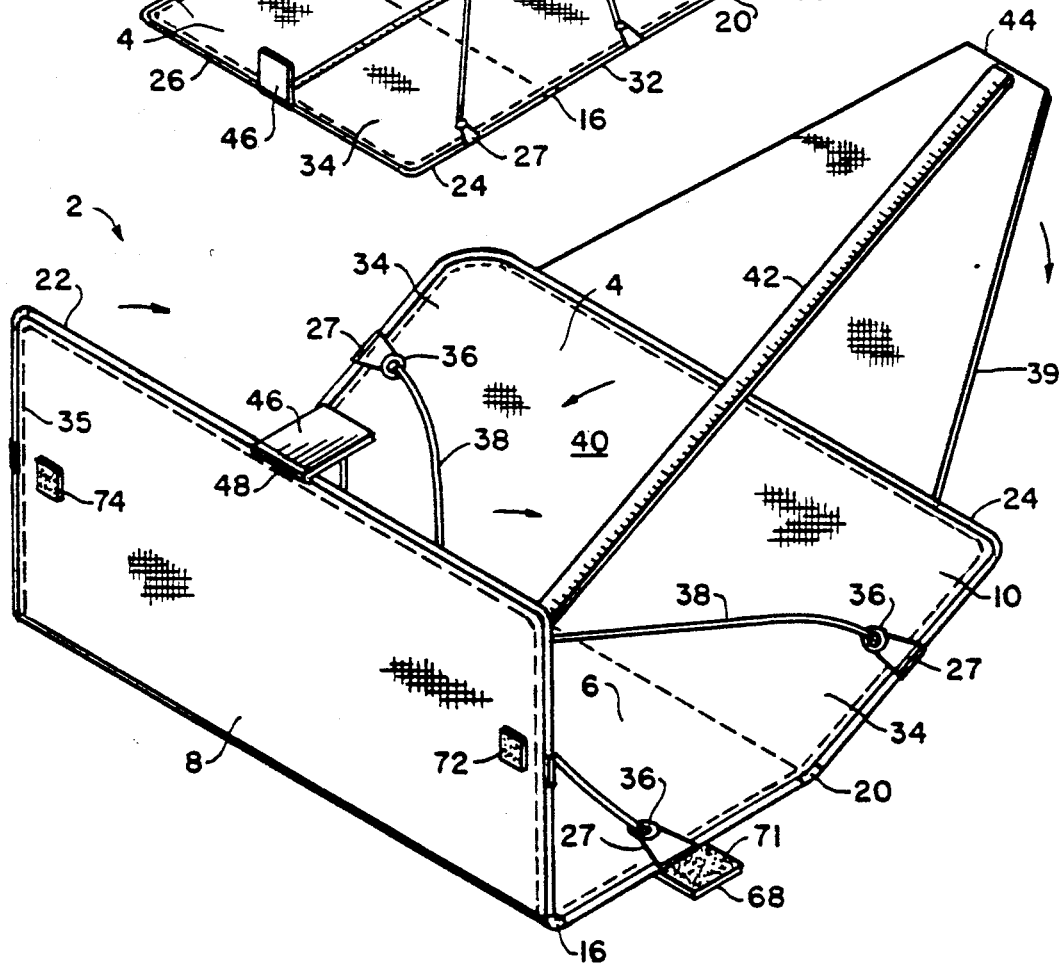
FIG. 2 is a perspective view of the bed and suspension cords partially folded.

In the accompanying drawing, the unique apparatus of the present invention is indicated generally by the number 2 in FIGS. 1 and 2.

The apparatus includes a foldable cloth bed 4 with a flat central section 6, a head section 8, and foot section 10. The head section 8 and foot section 10 are pivotally joined on opposed sides to the central section 6 by means of pivot joints 14 and 16 for the head section 8 and pivot joints 18 and 20 for the foot section 10 in a peripheral rod frame 22.

The peripheral rod frame 22 is enclosed in a hem 24 around the outer edges 26, 28, 30 and 32 of the continuous cloth material 34 which forms sections 6, 8 and 10. The hem is formed by wrapping the edge sections 26, 28, 30 and 32 around the rod frame 22 and securing by means of the stitching indicated by line 35.

The hem 24 of the cloth 34 around the frame 22 optionally may be reinforced by vinyl sheeting or other similar material stitched over the hem 24.

In general, the bed 4 is approximately 25 to 26 inches in length and 14 to 15 inches wide.

A foldable cloth extension 39 extends from the edge 30 of the foot section 10 and is comprised of the same cloth material 34 to provide a resting area for the feet of an infant after growing taller than 26". The extension 39 does not have a peripheral frame. It is usually integral with cloth 34 or may be stitched thereto, and can be folded and stored upon it. In FIG. 4 the lower surface of the extension 39 is provided with three Velcro patches 104, 106 and 108 which cooperate with matching Velcro patches 103, 105 and 107 on the lower surface 76 of the bed 4 so that the extension 39 may be folded back upon it and secured in place when not being utilized.

On the front surface 40 of the bed 4 along the longitudinal axis thereof is secured, by stitching or adhesively, a measuring tape 42 for determining the length and/or how tall is an infant placed on the bed 4. The tape 42 has an inch/foot scale on one edge and a centimeter scale on the other edge. The tape extends from the inner edge 26 of the head section 8 to the edge 44 of the cloth extension 39.

A foldable panel 46 along the edge 26 of the head section 8 is provided to place the head of the infant against during the measurement process. When moved to the upright position perpendicularly to the bed 4 surface, as shown in FIG. 1, it is held there in that position by means of a detent arrangement in the pivot hinge 48 in a well known manner. The hinge 48 is secured to the frame 22.

On either side of the bed along each of edges 28 and 32 are secured tabs 27 which are located at the approximate mid-point the edges of each of the head 8, central 6, and foot sections 10.

An attachment ring 36 is secured to each of the tabs 27, the tab 27 being looped around the corresponding ring 36 as shown.

Detachably connected to each tab ring 36 is a nylon cord 38 or chain line as shown in FIGS. 1 and 2 at the end of each cord 38 nearest the bed 4. The other ends 56 of the cords 38 are detachably connected to the lower longitudinal arm 51 of the bar holder 50 in pairs and secured so they do not move longitudinally on the bar 56. The bar 50 is in turn connected to a dependent arm 52 of a weighing scale 54 as shown. Preferably, the scale 54 has a digital readout 53 and may be read in kilograms and grams or in pounds and ounces simply by pressing button 57 on the side 66. Such scale devices are readily available.

A button control 59 is also provided for holding the indicated weight on display indefinitely or for a predetermined time following weighing in order to facilitate accurate recording of the weight indicated. This feature also is found on available scales. Scales with the foregoing features are readily available and the particulars of the scale operation are not part of this invention.

The ends 56 of the cords 38 are secured to rings 58 which may be detachably connected to a dog leash like clasp 60, which in turn has a ring 58 at the end which is detachably secured to one of the paired of brackets or clasps 64 and 65 similar to 60 longitudinally spaced and fixed on the bar 50 that is secured to the hanger 52.

The cords 38 are readily detached when desired to facilitate placing an infant on the bed for weighing and reattached to weigh the infant and raising the scale with the bed attached.

On each of edges 28 and 32 of the central section 6 of the bed 4 are flexible tabs 68 and 70 as shown with a Velcro face.

The bottom surface 76 of the head section 8 has corresponding Velcro pads 72 and 74 secured to the bottom surface 76 of cloth 34 and positioned so that when the head section 8 is folded over as in FIG. 5 the pad 68 and 70 register with the Velcro faces 72 and 74 to secure the folded sections in place as shown.

The rear of the panel 46 may be constructed with a storage pocket formed therein in which to store a cloth measuring tape which tape has inch indicia on one edge or surface and centimeter indicia on the other. This tape is utilized for determining various circumferential dimensions of the infant as previously mentioned. A digit tape may be used alternatively.

In FIG. 7 the details of the pivot joints 14, 16, 18 and 20 for the frame 22 are shown. A portion 86 of the frame 22 has a joint 14 for example formed at the extended end 90 holding a pivot pin 92 which fits through aperture 93 in end 90 and also passes through corresponding apertures in arms 100 and 102 of the adjacent arm section 98 in FIG. 7. The projection 104 on section 98 serves as a stop to permit the joint 14 to only operate through 180° and fold the frame sections 86 and 98 only in one direction, i.e. towards the upper surface 40 of the bed 4.

The apparatus provides a safe, convenient, comfortable and accurate means for determining the weight of an infant and measuring the length of the infant conveniently.

Preferably associated with the scale in use there is provided an illustrated book with instructions on determining the baby's weight, length, head and chest dimensions and with information on the normal parameters of such measurements according to the sex and age of the baby. Other information like, problems which may develop in breast or bottle feeding, vaccinations, bathing, cleaning; symptoms of common illness, sign of normal behavior, sight, hearing and other developmental information both physical and mental will be included.

While the invention has been described by reference to an illustrative embodiment, it is not intended that the novel device be limited thereby, but that modifications thereof are intended to be included as falling within the broad spirit and scope of the foregoing disclosure, the following claims and the appended drawings.

I claim:

1. Apparatus for conveniently and safely weighing and measuring an infant, said apparatus comprising a foldable cloth material bed having a head section, a central section and a foot section, a foldable peripheral frame for said bed, said cloth being secured to said frame at a periphery of said cloth, said frame having paired hinges for folding said bed inwardly only along transverse lines between said head and central section and between said central section and said foot section, length measuring means on an upper surface of said bed along a longitudinal axis thereof, a foldable head panel at an outer end edge of said head section of said bed for placing an infant's head against, pairs of cords secured at one end to opposite side edges of said bed frame on each of the head, central and foot sections, with other ends of said cords detachably secured to a bar holder which is connected to a weighing scale from which said bed is suspended when weighing an infant.

2. Apparatus as claimed in claim 1 wherein said scale is a digital scale.

3. Apparatus as claimed in claim 2 wherein said scale is readable in pounds and kilograms.

4. Apparatus as claimed in claim 1 wherein a cloth extension of said foot section is provided.

5. Apparatus as claimed in claim 1 wherein means are provided for releasably holding said bed sections in a folded position.

6. Apparatus as claimed in claim 5 including measuring means for determining a circumference of an infant body region.

7. Apparatus as claimed in claim 1 wherein said scale is readable in digital pounds or kilograms, said apparatus includes measuring means for determining a circumference of an infant body region and means for releasably holding said bed sections in a folded position.

8. Apparatus as claimed in claim 7 wherein a cloth extension of said foot section is provided.

* * * * *